United States Patent [19]
Carlin et al.

[11] Patent Number: 5,387,792
[45] Date of Patent: Feb. 7, 1995

[54] OPTICAL FREQUENCY ENCODING FOR NORMAL SHOCK AND POSITION SENSING

[75] Inventors: Christopher M. Carlin; Israel Frisch, both of Seattle, Wash.

[73] Assignee: The Boeing Company, Seattle, Wash.

[21] Appl. No.: 191,245

[22] Filed: Feb. 3, 1994

Related U.S. Application Data

[60] Division of Ser. No. 992,286, Dec. 16, 1992, Pat. No. 5,283,430.

[51] Int. Cl.⁶ .............................................. H01J 5/16
[52] U.S. Cl. ........................... 250/227.23; 250/231.19; 367/906
[58] Field of Search ........... 250/227.23, 227.16, 250/227.19, 227.18, 227.24, 573; 367/906, 140, 157; 381/172; 310/340

[56] References Cited

U.S. PATENT DOCUMENTS

| | | | |
|---|---|---|---|
| 2,971,329 | 2/1961 | Berry | 60/35.6 |
| 2,971,330 | 2/1961 | Clark | 60/35.6 |
| 3,163,981 | 1/1965 | Goodall et al. | 367/906 |
| 3,302,657 | 2/1967 | Bullock | 137/15.2 |
| 3,642,017 | 2/1972 | Homes | 137/81.5 |
| 3,911,260 | 10/1975 | Dustin | 235/151.34 |
| 3,966,324 | 6/1976 | Iten | 356/106 |
| 3,984,686 | 10/1976 | Fletcher et al. | 250/339 |
| 4,148,585 | 4/1979 | Bargeron et al. | 356/28.5 |
| 4,362,358 | 12/1982 | Hafle | 250/227.23 |
| 4,704,540 | 11/1987 | Hirai | 250/573 |
| 4,879,895 | 11/1989 | Sajben | 73/4 |

Primary Examiner—David C. Nelms
Assistant Examiner—Que T. Le
Attorney, Agent, or Firm—Conrad O. Gardner

[57] ABSTRACT

Optical frequency encoding for normal shock and position sensing where the modulated signal is coupled to a single fiber as a sum total of all the wavelength components.

2 Claims, 3 Drawing Sheets

OPTICAL FREQUENCY ENCODING FOR NORMAL SHOCK AND POSITION SENSING

RELATED PATENT APPLICATION

This application is a divisional of Ser. No. 07/992,286, filed on Dec. 16, 1992, now U.S. Pat. No. 5,283,430.

BACKGROUND OF THE INVENTION

This invention relates to normal shock sensing, and more particularly to optical frequency encoding for normal shock and position sensing.

Prior art systems utilize various means for shock detection; e.g., pressure sensors and acoustics have been used, and U.S. Pat. No. 3,302,657 to Bullock utilizes temperature sensors to detect shock position.

A current method of normal shock detection which utilizes a coherent image bundle is shown in U.S. patent application Ser. No. 07/984,166 filed Nov. 20, 1992, now abandoned, and also assigned to The Boeing Company.

An optical normal shock sensor utilizing a coherent image bundle necessitates a fiber per pixel to transmit linear position information. The result of utilization of a coherent image bundle is the requirement for a large number of fibers.

THE PRESENT INVENTION

In accordance with the present invention, wavelength intensity modulation is utilized, wherein the modulated signal is coupled into a single fiber as a sum total of all the wavelength components, thereby resulting in great reduction in the number of fibers required to transmit the normal shock position.

DETAILED DESCRIPTION OF THE INVENTION

The invention will be described in more detail hereinafter with reference to the accompanying drawings, wherein like reference characters refer to the same parts throughout the several views and in which.

Figure 1:
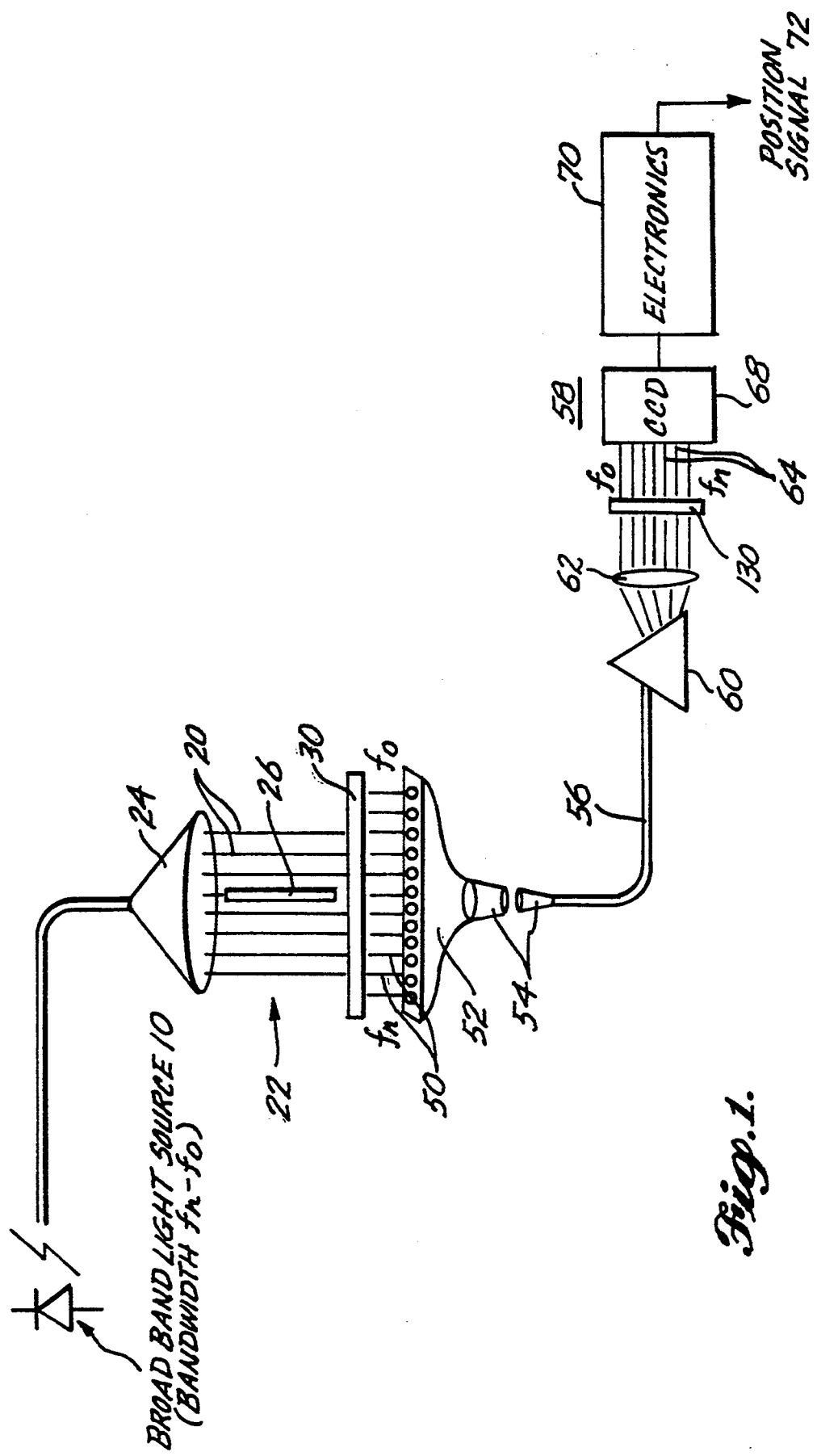
FIG. 1 is a schematic diagram of the preferred embodiment of the present optical frequency encoding normal shock sensing system.

Turning now to FIG. 1, illustrative of the present optical frequency encoding system for normal shock and position sensing in which a broadband light source 10, an optical fiber and a collimating system 24 are utilized to provide collimated light 20 to the inlet area 22 of an aircraft engine where shock position detection is to be made. In the collimating system 24, optical fiber output is allowed to expand to cover the linear space over which the normal shock will travel. The expanded beam is passed through collimating lens 24. The collimated beam is allowed to interact with the phenomena of interest, in this case the modulating phenomena 26 being normal shock (NS). The effect of NS is to cause the light 20 to bend or refract at points of contact with the NS, as seen at 28 in FIG. 2. The result is generation of a shadow falling on color gradient filter 30.

Figure 2:
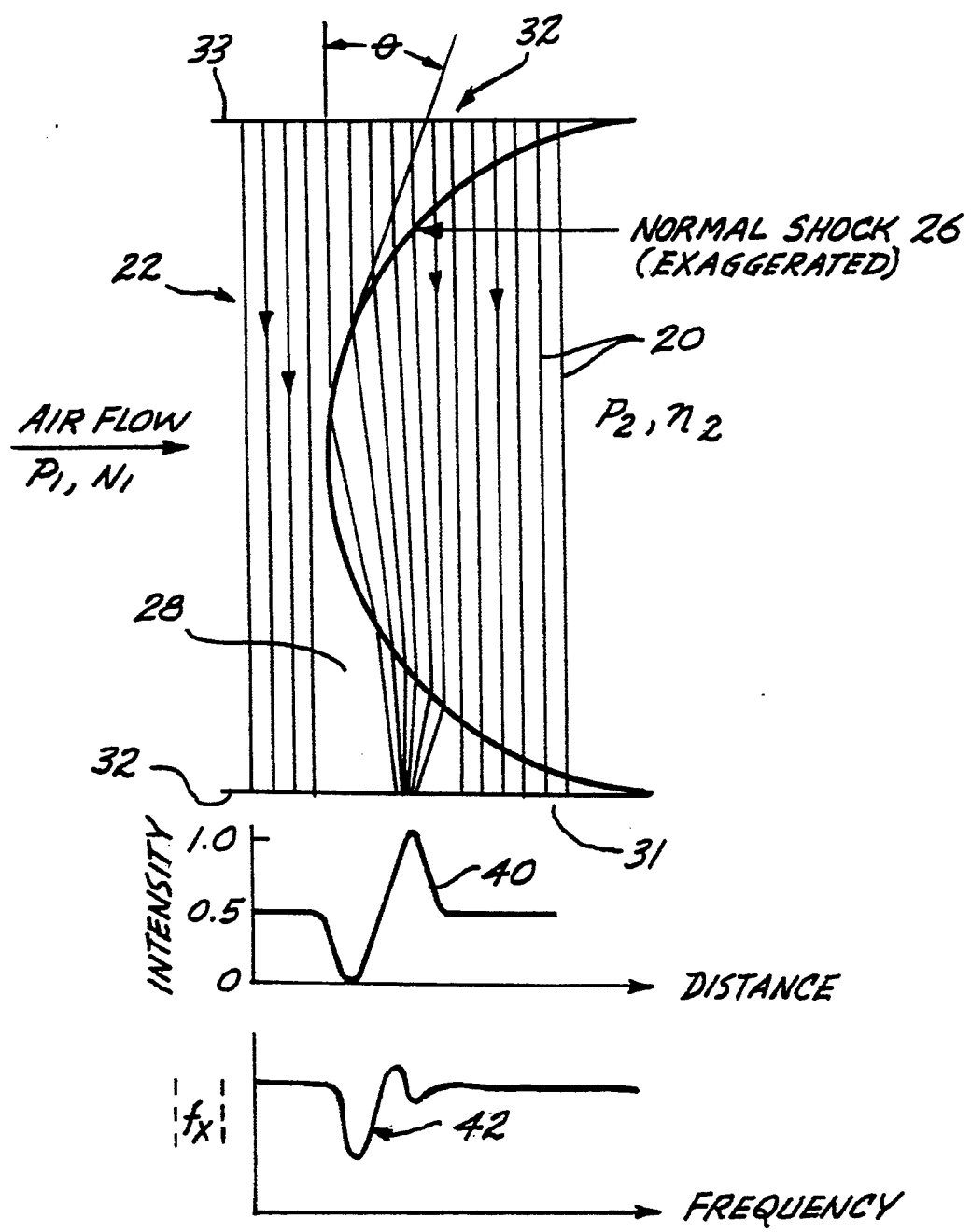
FIG. 2 is a graphical representation of the present shadowgraph detection mechanism showing color gradient filter location in the present system, the intensity pattern on the color gradient filter, and the color gradient filter output frequency content; and, FIG. 3 is a graphical representation of the optical frequency encoding gradient color filter characteristics.
Figure 3:
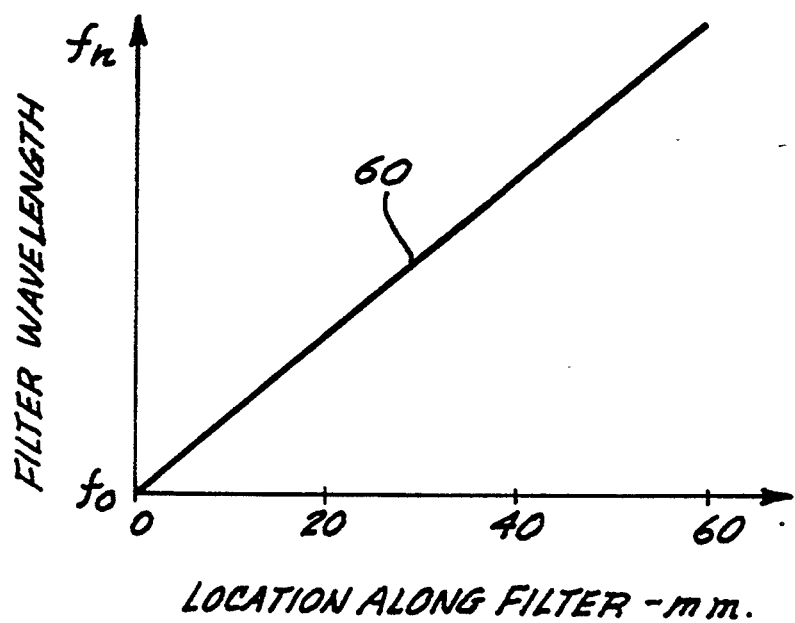

Turning now briefly to FIG. 2, wherein the shadowgraph mechanism is more clearly seen, it should be noted that color gradient filter 30 is located at 31 adjacent inlet wall 32, while broadband collimated light eminates from collimating system 24 located at 32, adjacent inlet wall 33. Color gradient filter 30 has the property of varying its bandpass as a function of linear distance, as seen in plot 60 of FIG. 3.

Returning to FIG. 2, a plot 40 of intensity versus distance shows the intensity pattern imposed on color gradient filter 30. Plot 42 shows the resulting filter output intensity as a function of frequency. In addition, since the filter bandpass frequencies are linearly related to linear displacement along the filter, plot 42 represents the encoding of the shock position information as a function of frequency.

In FIG. 2, $\rho$ corresponds to air density while n corresponds to the index of refraction and $n_1 \sin \theta_1 = n_2 \sin \theta_2$ and $\rho_2, n_2 > \rho_1, n_1$.

The refracted beam resulting in a shadow does not energize the wavelength corresponding to the position of the shadow. This results in attenuation of this frequency or a frequency shadow.

Returning to FIG. 1, it may be observed that exiting beam 50 out of gradient color filter 30 is coupled and combined through optics (e.g., converging linear optical array 52 and a plurality of optical tapers 54) to an optical fiber, and then further transmitted downstream through this optical fiber to signal processing means 58. Signal processing means 58 passes the light through demodulator 60 comprising a prism or grating for expanding the light into component frequencies. A collimator 62 then receives the light, which is passed to the CCD 68. The frequency shadow 64, thus developed, is seen by the linear charge coupled device (CCD) 68. NS movement results in attenuation and amplification of a narrow range of frequencies. The modulated frequencies are detected by linear charge coupled device 68, where they are spatially resolved in a method somewhat analogous to frequency to voltage conversion. Suitable readout electronics 70 provides position signal 72.

The present system and method is useful in the measurement of various shadow producing objects; e.g., a position feedback indicator for use in a closed loop actuation system.

The foregoing disclosure and description of the invention are illustrative and explanatory thereof, and further modifications thereof may be made by those skilled in the art without departing from the spirit and scope of the invention, defined only by the following claims.

What is claimed is:

1. A method for measuring the position of a shadow producing object comprising:
   developing an intensity pattern on a color gradient filter in response to the object, thereby developing a wavelength intensity modulated signal; then
   coupling said wavelength intensity modulated signal to a single optical fiber for providing object position information.

2. The method, according to claim 1, for use in a closed loop actuation system to provide position feedback indication.

* * * * *